(12) United States Patent
Baker et al.

(10) Patent No.: US 11,551,580 B2
(45) Date of Patent: Jan. 10, 2023

(54) RESETTABLE INJECTION TRAINING DEVICE

(71) Applicant: NOBLE INTERNATIONAL, INC., Orlando, FL (US)

(72) Inventors: Jeff Baker, Orlando, FL (US); Shishuang Hou, NingBo (CN); Tingting Liu, Orlando, FL (US)

(73) Assignee: NOBLE INTERNATIONAL, INC., Orlando, FL (US)

( * ) Notice: Subject to any disclaimer, the term of this patent is extended or adjusted under 35 U.S.C. 154(b) by 626 days.

(21) Appl. No.: 16/551,107

(22) Filed: Aug. 26, 2019

(65) Prior Publication Data

US 2020/0265753 A1 Aug. 20, 2020

Related U.S. Application Data

(60) Provisional application No. 62/807,472, filed on Feb. 19, 2019.

(51) Int. Cl.
*G09B 23/28* (2006.01)
*G09B 19/00* (2006.01)
*G09B 9/00* (2006.01)

(52) U.S. Cl.
CPC ......... *G09B 23/285* (2013.01); *G09B 19/003* (2013.01); *G09B 9/00* (2013.01)

(58) Field of Classification Search
CPC ....... G09B 23/285; G09B 19/003; G09B 9/00
USPC ...................................................... 434/262
See application file for complete search history.

(56) References Cited

U.S. PATENT DOCUMENTS

| 9,911,364 | B2* | 3/2018 | Baker | G09B 23/285 |
| 10,089,902 | B2* | 10/2018 | Baker | G09B 19/24 |
| 11,069,260 | B2* | 7/2021 | Baker | G09B 23/285 |
| 2012/0015336 | A1* | 1/2012 | Mach | G09B 23/285 |
| | | | | 434/262 |
| 2013/0236872 | A1* | 9/2013 | Laurusonis | G09B 23/285 |
| | | | | 434/262 |
| 2016/0293058 | A1* | 10/2016 | Gaillot | G09B 23/285 |
| 2016/0335920 | A1* | 11/2016 | Bendek | G09B 23/285 |
| 2017/0337844 | A1* | 11/2017 | Baker | G09B 19/24 |

OTHER PUBLICATIONS

"Assurance. ByDesign. BD Physioject Disposable Autoinjector", 2013, 4 pages, https://drugdeliverysystems.bd.com/documents/brochures/drug-delivery/PS_Physioject-disposable-autoinjector_BR_EN.pdf.

* cited by examiner

*Primary Examiner* — Robert P Bullington
*Assistant Examiner* — Stephen Alvesteffer
(74) *Attorney, Agent, or Firm* — Timothy H. Van Dyke; Wolter, Van Dyke, Davis, PLLC

(57) ABSTRACT

A resettable injection training device for simulating an injection is provided in an embodiment herein. The device may include an outer housing, a safety shield having a proximal end and a distal end, the distal end for engaging with a target surface during an injection simulation, the safety shield comprising a retracted position, an extended unlocked position and an extended locked position, a plunger; and a locking tab for interfacing with the safety shield for interfacing with the safety shield the extended locked position, wherein if the safety shield distal end disengages from the target surface during an injection simulation, the safety shield extends to the extended, locked position until the device is reset.

20 Claims, 11 Drawing Sheets

RESETTABLE INJECTION TRAINING DEVICE

CROSS REFERENCE TO RELATED APPLICATIONS

This application claims priority to U.S. Provisional Application No. 62/807,472 filed Feb. 19, 2019. The entirety of this application is incorporated herein by reference.

BACKGROUND

Injection devices have recently become increasingly popular for single dose or multi-dose, at home self-administration. These devices include both auto-injection devices and pre-filled syringe devices, and are often designed to accomplish two basic objectives: convenience of drug delivery in an outpatient or at home setting, and/or automation of drug delivery in an outpatient or at-home setting.

Injectable medications are required for a number of varying illnesses and diseases. A number of injectable medications require self-injection by a patient. Self-injection of a medicament using a device having a needle carries with it a certain stigma. Oftentimes patients are weary of injecting themselves for fear or anxiety related to failing to receive a complete dose of the medication, pain associated with injecting oneself with the needle, accidentally sticking oneself with the needle, and difficulties in adequately grasping the dosing mechanism to inject oneself, among other concerns. These fears and anxieties associated with the currently available self-injection devices may result in the administration of an incomplete dose of a medicament, failure to administer any portion of the dose of a medicament, or accidentally sticking oneself with the needle of the device, which in some instances could lead to unwanted transmission of diseases if the needle is contaminated.

An additional concern exists with regard to injection devices is that users with little or no medical knowledge or experience are injecting themselves or injecting others using these devices. Performing a medical treatment or test on oneself or others carries with it certain risks and often creates a level of anxiety for the user performing the treatment or test. It has proven beneficial in the medical field to practice various medical techniques including drug delivery, specifically where it relates to injections and other invasive drug delivery means prior to delivering the medications to a patient in need, and particularly in the case of self-administration of medicaments. Training devices are helpful in reducing anxiety associated with self-administering medical treatment, as well as increasing efficiency and accuracy in providing the treatment to patients. Medical devices can be intimidating to use; the fear associated with giving oneself an injection, for example, can be traumatic. This fear is increased in persons with little or no experience in self-administration of medications. Consequently, devices to assist in training individuals to inject themselves or otherwise self-administer medication are beneficial in decreasing or preventing the anxiety associated with medicament delivery. Safe use and re-use of these training devices requires a resettable device. Therefore, a device which allows repeated practice and ease of use to enhance familiarity with the injection device and the self-injection process, along with the ability to safely and efficiently reset the device is paramount to an effective device for injection training.

SUMMARY

A resettable injection training device for simulating an injection is provided in an embodiment herein. The device may include an outer housing, a safety shield having a proximal end and a distal end, the distal end for engaging with a target surface during an injection simulation, the safety shield comprising a retracted position, an extended unlocked position and an extended locked position, a plunger; and a locking tab for interfacing with the safety shield for interfacing with the safety shield the extended locked position, wherein if the safety shield distal end disengages from the target surface during an injection simulation, the safety shield extends to the extended, locked position until the device is reset.

In an embodiment, a resettable injection training device is provided. The device includes an outer housing having a proximal end and a distal end, a safety shield, having a proximal end and a distal end and being slidable relative to the outer housing between an extended unlocked position, a retracted position, and an extended locked position, a plunger slidable relative to the outer housing between a retracted position and an extended position, an actuation member associated with the proximal end of the inner housing, comprising an unlocked position and a locked position, said actuation member being unlocked when the safety shield is in the retracted position, an actuation member collar for locking the actuation member when the safety shield is in an extended locked position or an extended unlocked position, a rotatable plunger collar for interfacing with the actuation member and the plunger, such that depression of the actuation member rotates the plunger collar to release the plunger to the extended position, wherein a pressure on the safety shield distal end slides the safety shield from the extended unlocked position to the retracted position, rotating the actuation member collar to unlock the actuation member, such that depression of the actuation member releases the plunger to the extended position, and wherein following release of the pressure on the safety shield distal end, the safety shield extends to the extended locked position and the actuation member is reset to its locked position.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order, quantity or importance, but rather the terms first, second, etc., are used to distinguish one element from another. The modifier "about" used in connection with a quantity is inclusive of the stated value and has the meaning dictated by the context. It is to be noted that all ranges disclosed within this specification are inclusive and are independently combinable.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 7. As another non-limiting example, a range of "between 20 and 10" can also include the values 20, 10.

The term "adjacent" as used herein, includes but is not limited to near, associated with, or in close proximity to.

As used herein, the term "pre-use position" refers to an inactive, yet extended position of the safety shield. However, in the pre-use position, the shield is retractable and is not locked. The safety shield is typically in this position prior to using the device, or following reset of the device for a subsequent use.

As used herein, the term "retracted position" refers to a position of the safety shield, in which the shield is activated and fully retracted, in other words upon a force on a distal end of the safety shield, the safety shield is retracted, at least partially within a housing of the device.

As used herein, the term "post-use position" indicates a position of the shield in which the device has been used to simulate a injection, or a training has been completed. In a post-use position, the shield may be locked until it has been reset to a pre-use position.

Device embodiments described herein are for simulating injection with an auto-injector device, in a manner so as to closely simulate the device injection experience. The simulation involves visual, auditory, gustatory, olfactory, and tactile simulation, among others. The device embodiments described herein provide, for example, resettable auto injector training devices for training a user to use the drug delivery device and to reduce or eliminate any anxiety associated with delivery medicament with the drug delivery device as well as reduce or eliminate any errors associated with the delivery of drug with the drug delivery device.

Figures 1, 2:
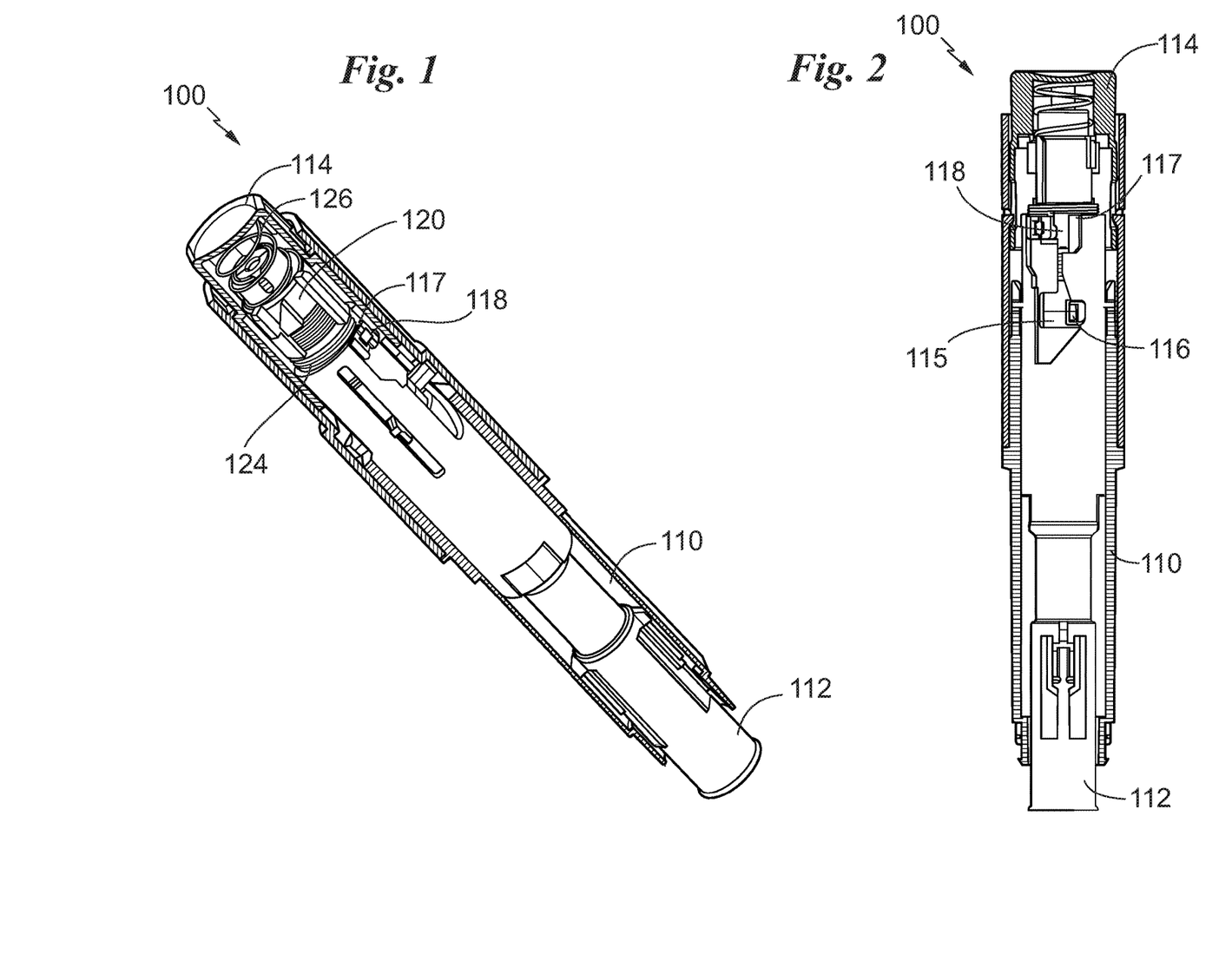
FIG. 1 is a perspective cutaway view of an embodiment of a resettable injection training device.
FIG. 2 is a side view of the device embodiment shown in FIG. 1.

FIG. 1 includes a perspective cutaway view of an embodiment of a resettable injection training device 100. The resettable injection training device 100 includes an outer housing 110, an actuation member 114, and a safety shield 112. A plunger 125 (not seen in FIG. 1) is slidable within the device 100. The safety shield 112 is slidable within the outer housing 110, and includes proximal end 11a and a distal end 11b, the distal end 11b for interfacing with a target surface to actuate the injection training device 100. The safety shield 112 includes an extended locked position, an extended unlocked position, and a retracted position. When the safety shield 112 is in an extended unlocked position, the distal end 11b may be pressed against a target surface to release the actuation member 114 to actuate the device 100. Upon application of a force against the distal end 11b of the safety shield 112 moving the safety shield 112 from the extended unlocked position to its retracted position, the actuation member 114 is unlocked, and the device is ready to be actuated (i.e., fired) by pressing on the actuation member 114. FIG. 1 also shows an actuation member collar 117 having an actuation member lock 118, and a first biasing member 124 for rotating the actuation member collar 117. In one embodiment, the first biasing member 124 may include a torsion spring. Other biasing members may be provided in the device 100, including a second biasing member 126 associated with the actuation member 114, for providing resistance on the actuation member 114. A plunger collar 120 is associated with the plunger 125 and interfaces with the plunger to release the plunger 125 from the device 100 during use.

FIG. 2 provides a side view of the device 100 shown in FIG. 1 in a "ready to fire" position. In FIG. 2, the outer housing 110 is provided, and the safety shield 112 is shown in an extended unlocked position. A safety shield collar 115 having a safety shield locking tab 116 is shown in FIG. 2. The safety shield collar 115 is rotatable and interfaces with the safety shield 112 to lock or unlock the safety shield 112. A force on the distal end of the safety shield 112 rotates the actuation member collar 117 to release the actuation member 114, allowing the actuation member 114 to be depressed. Depression of the actuation member 114 causes rotation of the plunger collar 120 (shown in FIG. 1), which releases the plunger 125, allowing the plunger to travel in a distal direction relative to the outer housing 110 to simulate an injection.

Figure 3A:
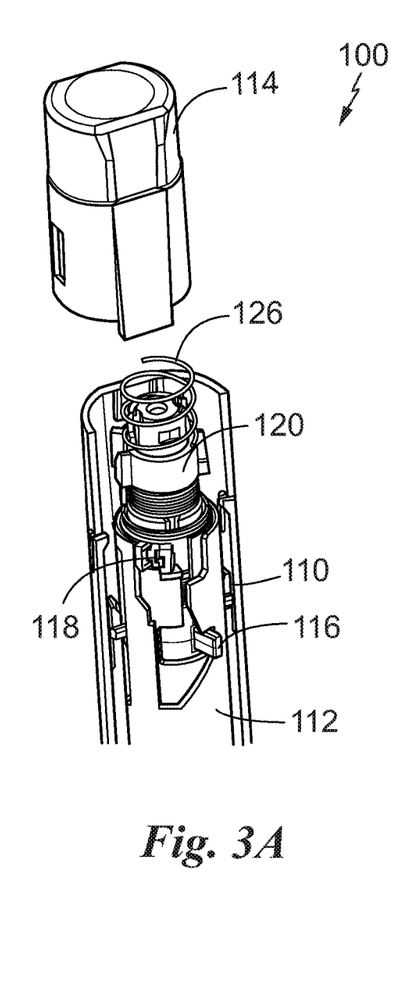
FIG. 3A is a partial exploded view of the proximal end of an embodiment of the device in a ready to use position.
Figure 3B:
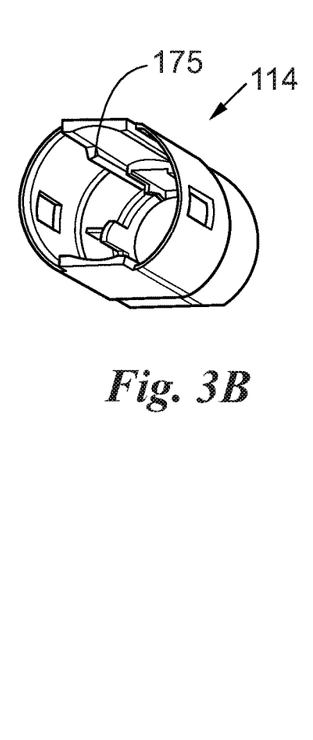
FIG. 3B provides a view of the inner portion of an embodiment of an actuation member.

FIG. 3A is a partial exploded view of the proximal end of the device 100 in a ready to use position, showing the actuation member 114 removed from the device, exposing the second biasing member 126. In the exploded view the actuation member collar 117 and actuation member lock 118 are visible, as well as the safety shield lock 116, and safety shield 112. FIG. 3B provides a view of the inner portion of the actuation member 114, showing a protrusion 175 for interfacing with the actuation member lock 118 when the actuation member 114 is in a locked position. Upon rotation of the actuation member collar 117, the actuation member lock 118 is displaced from the protrusion 175, to allow the actuation member 114 to be depressed to release the plunger during use of the device.

Figure 4:
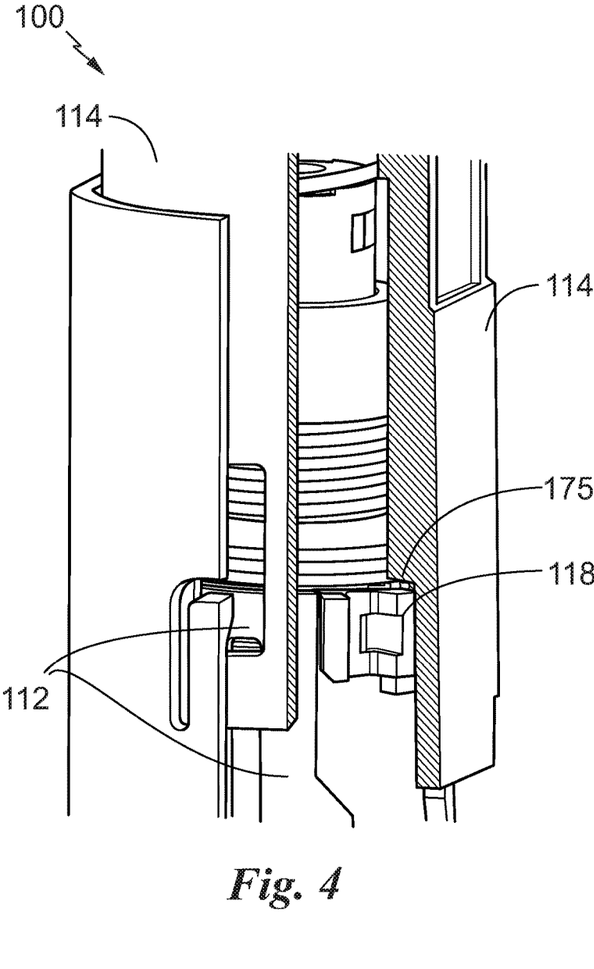
FIG. 4 is a side view of a portion of an embodiment of the device.

FIG. 4 shows the interaction between the actuation member 114 and the actuation member collar 117 by way of the protrusion 175 and the actuation member lock 118.

Figure 5:
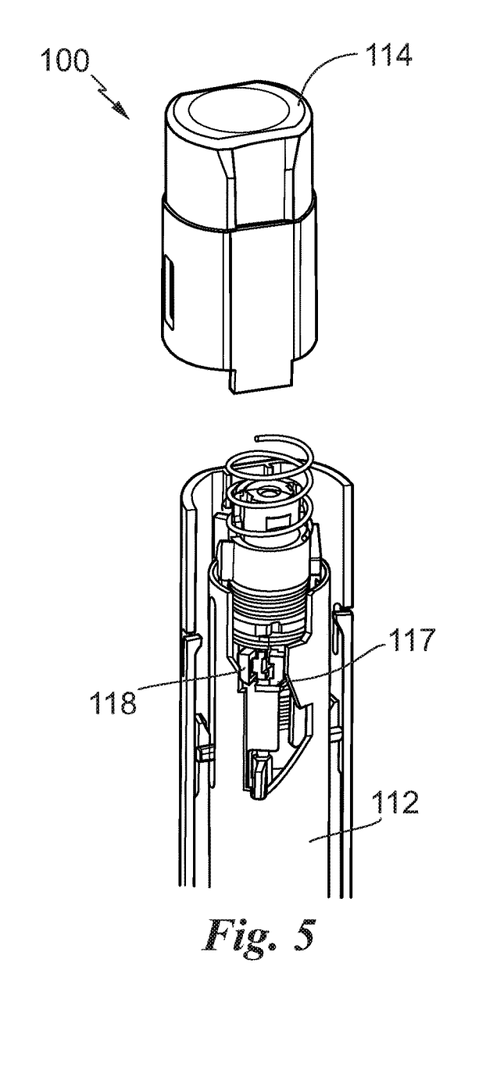
FIG. 5 is an exploded view of a proximal end of an embodiment of the device.
Figure 6:
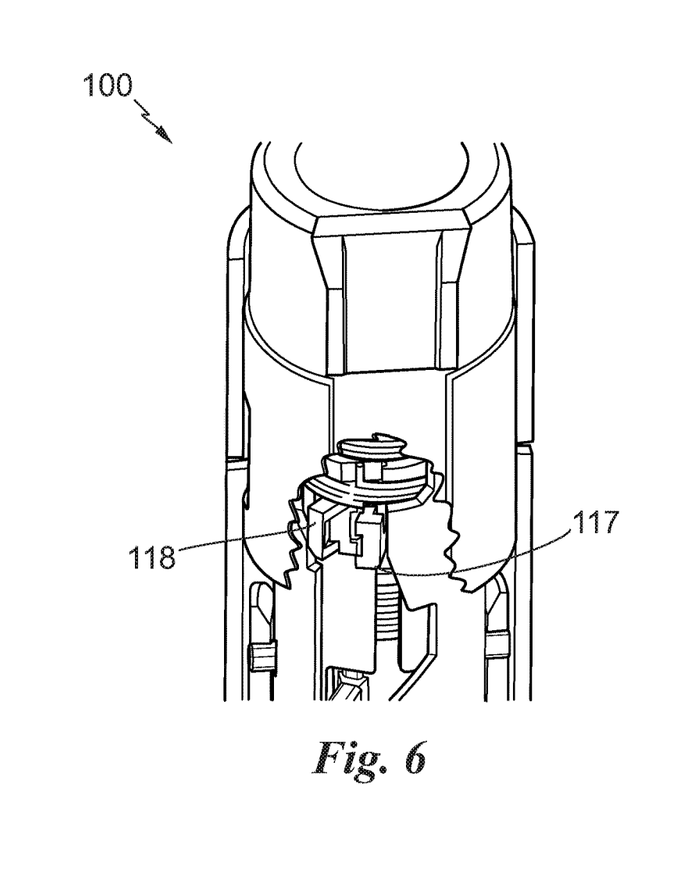
FIG. 6 is a side view of an embodiment of the device as shown in FIG. 5.
Figure 7:
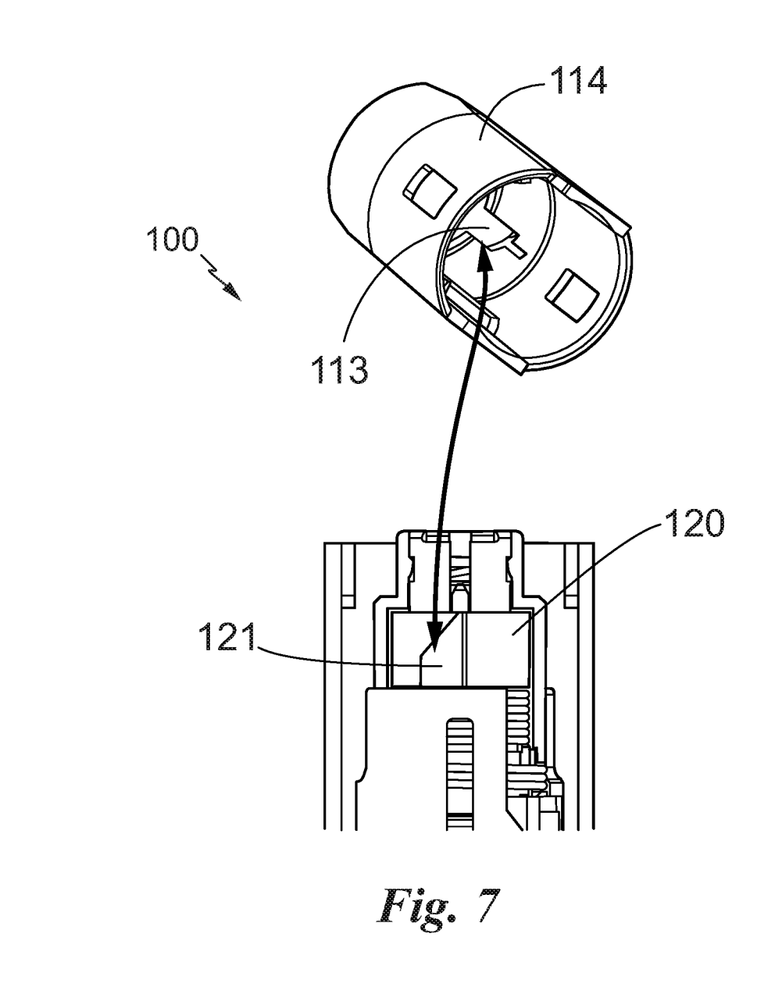
FIG. 7 is a partially exploded view and cross sectional view of a proximal end of the device.

FIG. 5 shows the step of unlocking the actuation member 114, wherein a force on the distal end of the safety shield 112 causes the safety shield to move from the extended unlocked position to its retracted position, rotating the actuation member locking collar 117 in a counter clockwise direction when viewed from the proximal end of the device 100. This rotation of the actuation member collar 117 unlocks the actuation member 114, allowing depression of the actuation member to actuate the device 100. FIG. 6 provides a close up view of this interaction, wherein the protrusion 175 (protrusion not visible in FIG. 6) is free of the actuation member lock 118.

Figure 8:
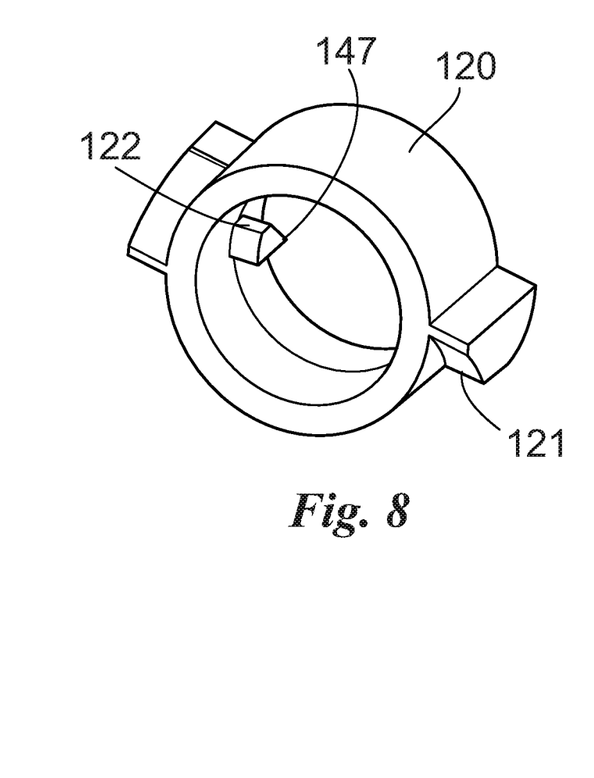
FIG. 8 is a perspective view of the plunger collar, in an embodiment.

Once the actuation member 114 is unlocked, depression thereof causes an internal actuation member ramp 113 to interface with a plunger collar outer ramp 121, causing rotation of the plunger collar 120 in a counter clockwise direction when viewed from the proximal end of the device. Movement of the plunger collar 120 allows release of the plunger 125 for actuation of the device. A perspective view of the plunger collar 120 showing the plunger collar outer ramp 121 and a plunger locking tab 122 on an inner surface thereof is shown in FIG. 8. Plunger collar inner ramp 147 is also shown in FIG. 8, and is used during reset of the device 100 as will be explained in greater detail.

Figure 9:
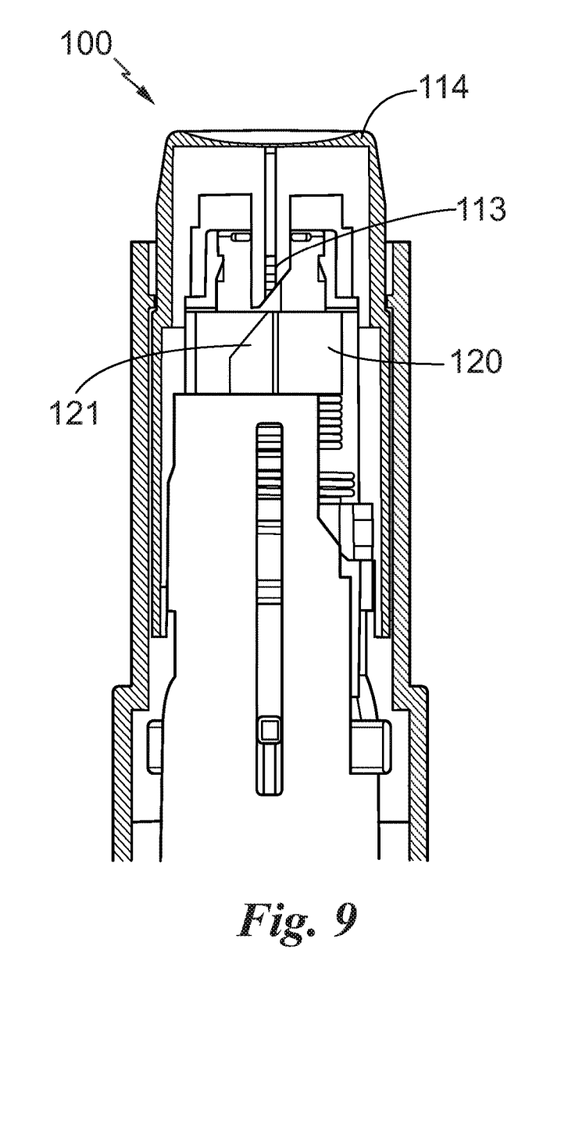
FIG. 9 shows an embodiment of the device and one step in sequence of actuation of the actuation member.
Figure 10:
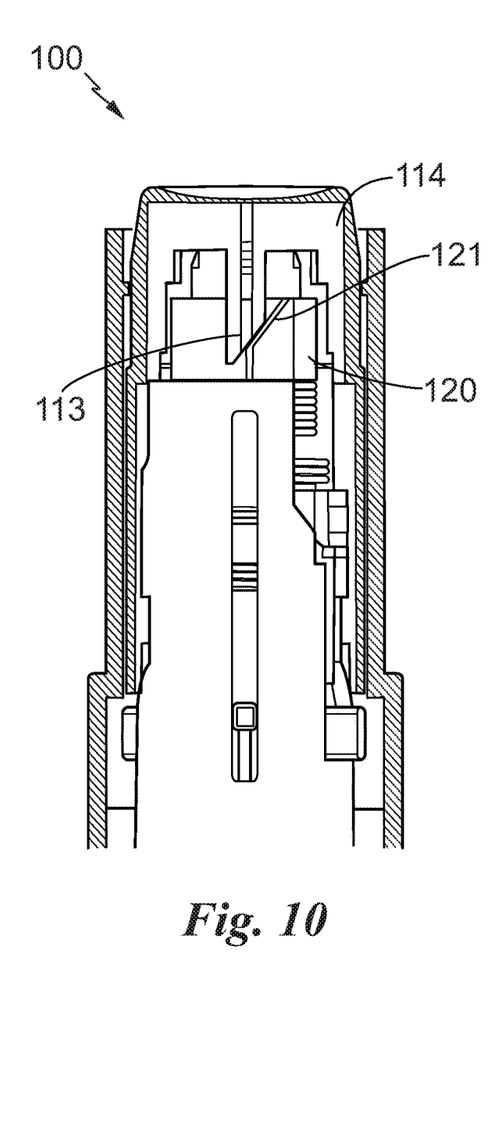
FIG. 10 shows an embodiment of the device and an additional step in sequence of actuation of the actuation member.

FIGS. 9 and 10 show steps in sequence of actuation of the actuation member 114 and its interaction with the plunger collar 120. Depression of the actuation member 114 as shown in FIG. 10 causes the actuation member ramp 113 to interface with a plunger collar outer ramp 121, resulting in counter clockwise rotation of the plunger collar 120.

Figure 11:
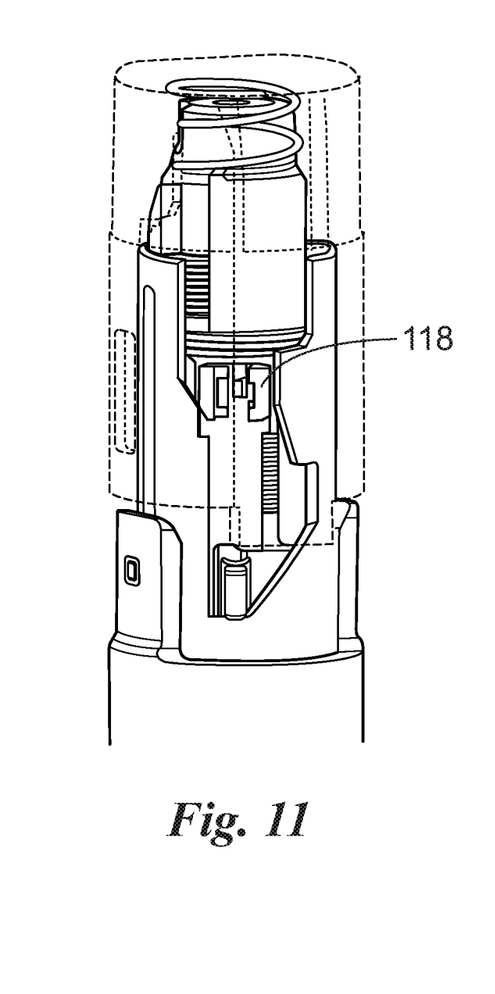
FIG. 11 shows release of the actuation member following actuation of the device, in one embodiment.
Figure 12:
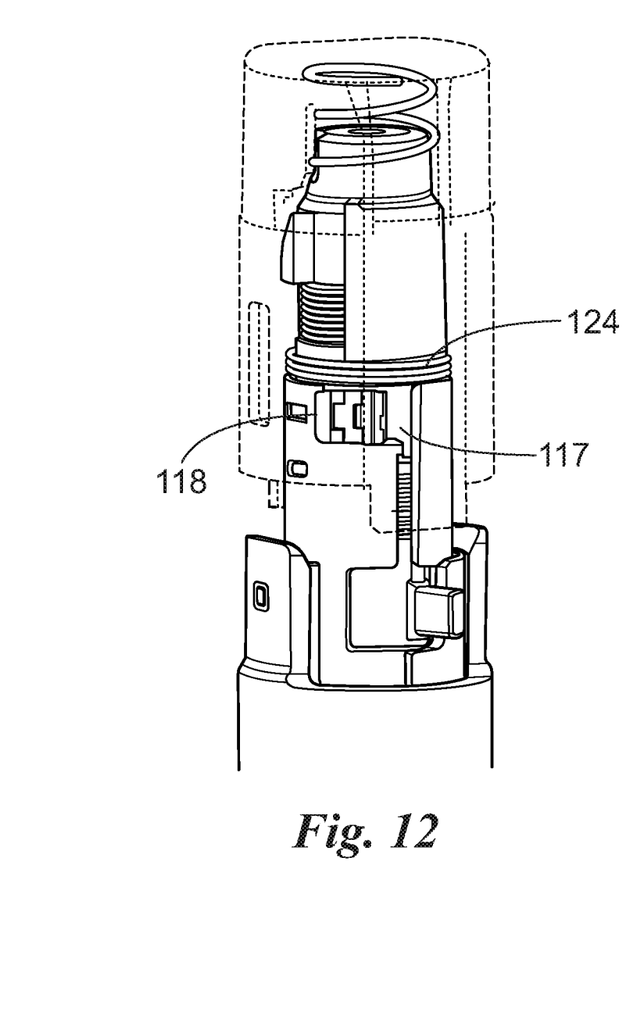
FIG. 12 shows release of the actuation member following actuation of the device in one embodiment.

FIGS. 11 and 12 show release of the actuation member 114 following actuation of the device, and release of the force on the distal end of the safety shield 112. Once the injection simulation has been completed, the actuation member 114 is released, causing it to extend in a proximal direction as shown in FIG. 12, and allowing rotation of the actuation member collar 117 in a clockwise direction under the rotational force of the first biasing member 124. This allows the actuation member 114 to be locked following use of the device 100. After completion of the injection simulation, the device 100 is released from the target area, allowing the safety shield 112 to extend to an extended, locked position until unlocked for a subsequent use.

Figure 13:
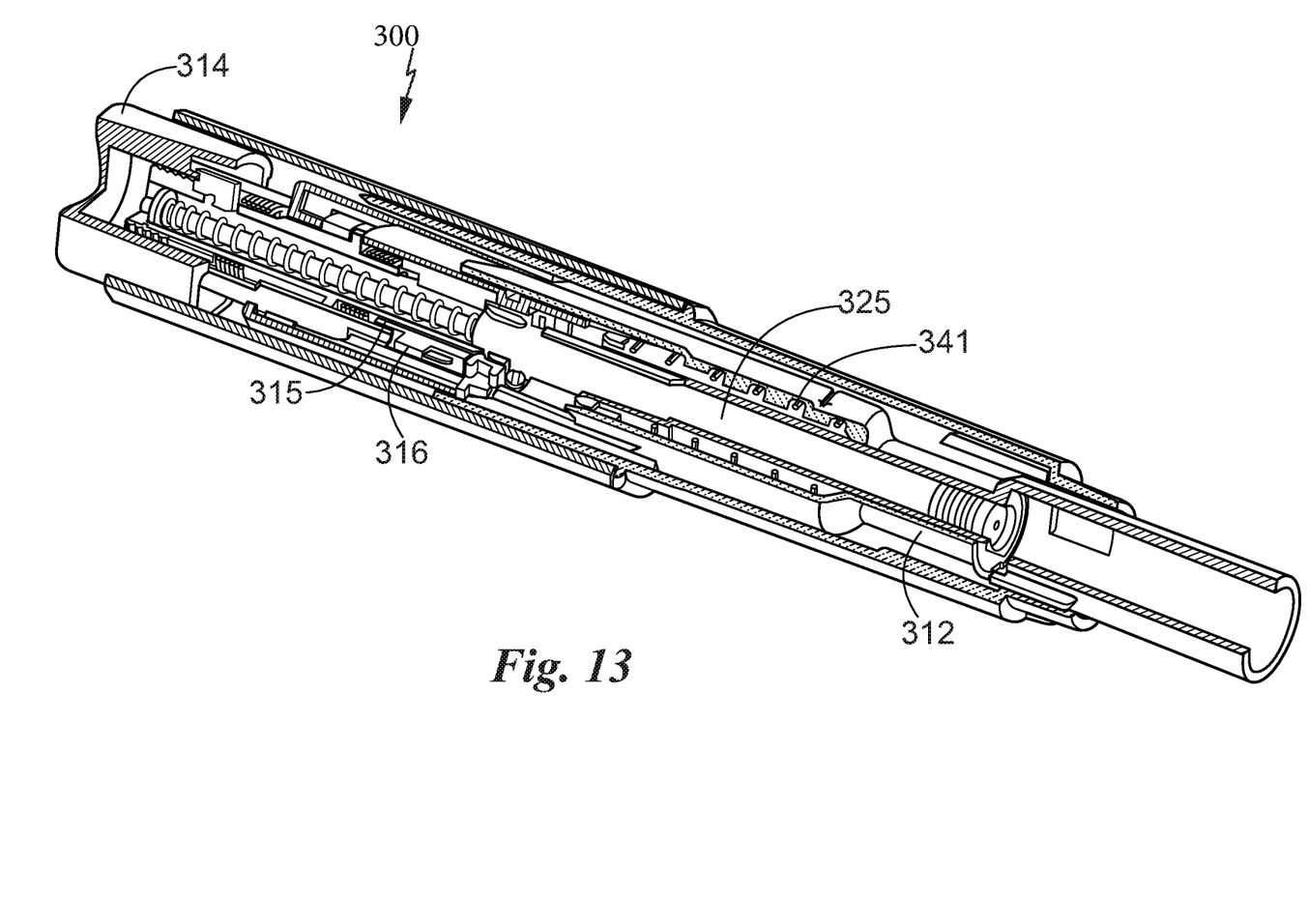
FIG. 13 is a partial sectional view of another embodiment of the device showing extension of the safety shield.
Figure 14:
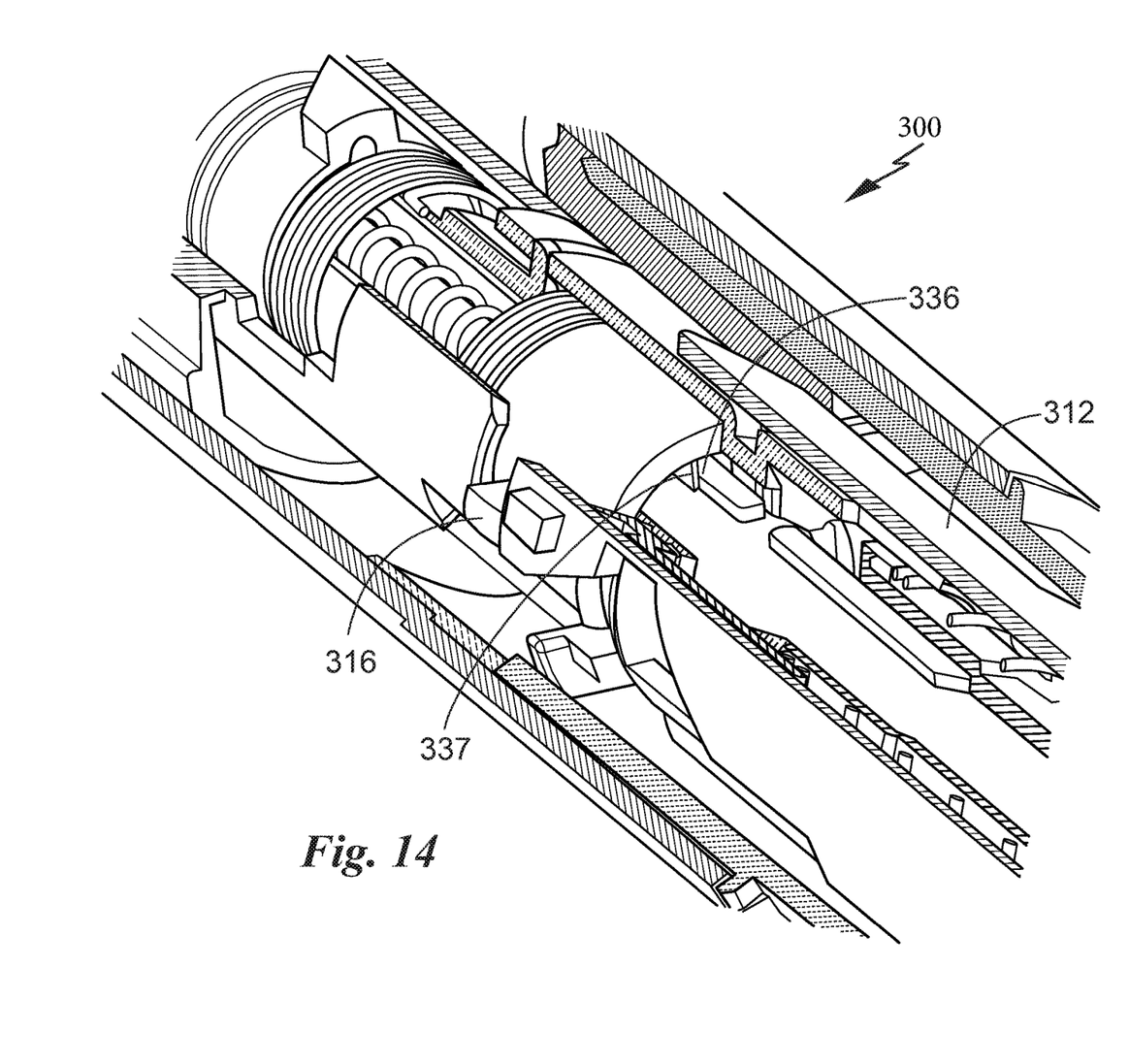
FIG. 14 is a partial view of the internal components of the embodiment of the device of FIG. 13 upon insertion of the reset member into the distal end of the device, resetting the plunger.
Figure 15:
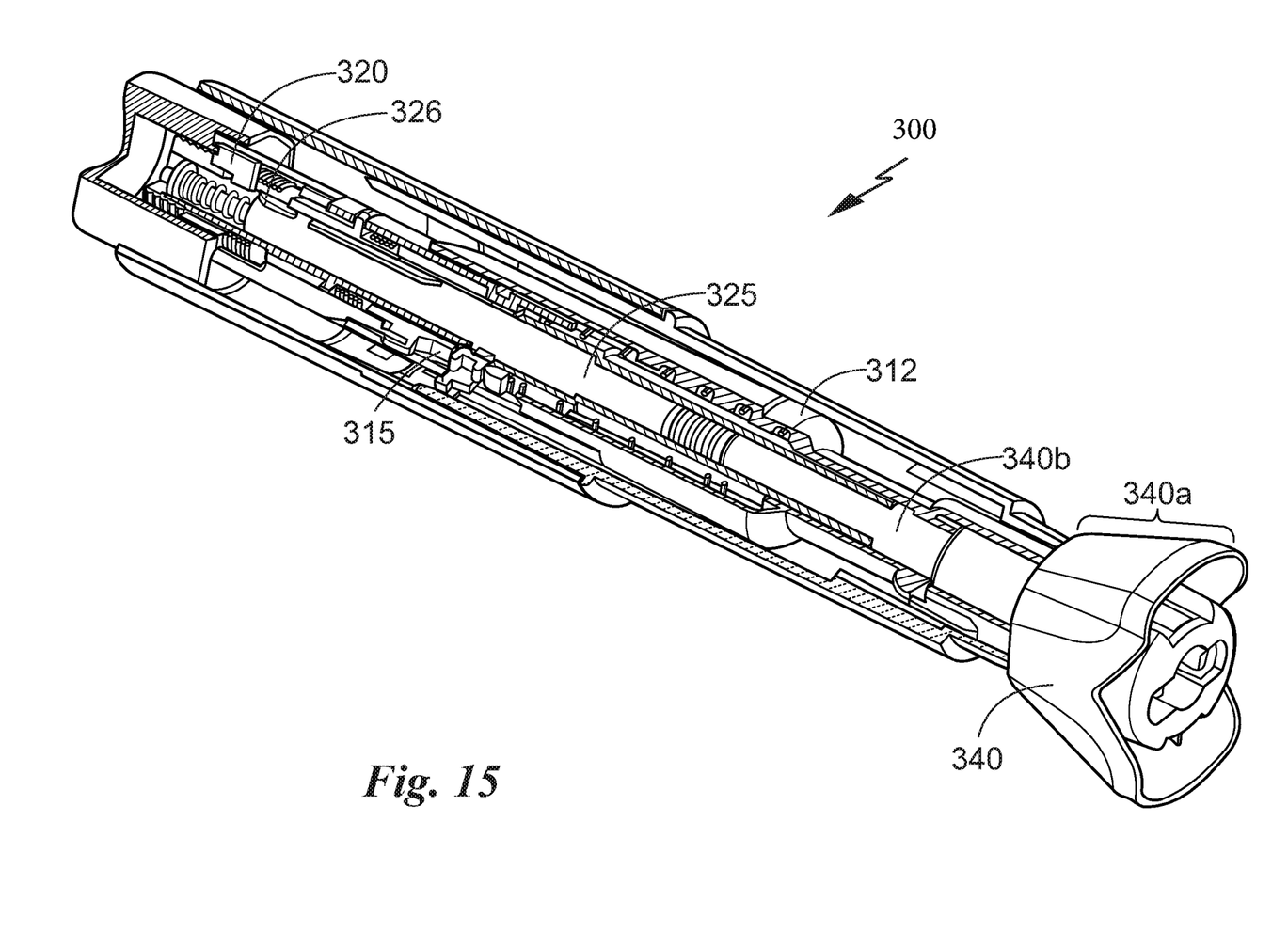
FIG. 15 is a partial sectional view of the embodiment of the device shown in FIGS. 13-14 during reset, the reset cap shown fully inserted into the device.

Reset of the resettable injection training device 100 is shown in FIGS. 13-15 by insertion of a resettable component 140 into a distal end of the device, such that a protrusion of the resettable component 140 contacts the plunger 125 and a base of the resettable component contacts the safety shield 112. Continued movement of the resettable component 140 toward the proximal end of the device resets the plunger 125 to a pre-use position, and the safety shield to an extended, unlocked position for a subsequent use.

FIG. 13 is a partial sectional view of another embodiment of the device 300 showing the plunger 325 in a fully extended position, and the safety shield 312 in the extended, locked position following use of the device 300, and removal of the distal portion of the housing from the target site of the user allowing for full extension of the safety shield 312 under the force of a safety shield spring 341. The safety shield lock 316 is shown as disposed above the safety shield 312 in order to limit or prevent proximal movement of the safety shield 312 prior to reset of the device 300.

FIG. 14 is a partial view of the internal components of the device embodiment 300 upon insertion of the reset cap 340 (shown in FIG. 15) into the distal end of the device 300. Insertion of the reset cap 340, wherein reset cap 340 includes a gripping portion 340a, and a protrusion portion 340b (shown in FIG. 15) into the distal end of the device 300 until the protrusion portion 340b contacts a distal end of the plunger 325 resets the device 300 as the reset cap 340 is moved within the device toward the proximal end. Contact between protrusion portion 340b and the plunger 325 and movement in a proximal direction causes the plunger 325 to reset to a pre-use, retracted position. This movement of the plunger 325 causes a plunger ramp feature 336 (visible in FIG. 14) to interface with a locking tab feature 337 on an inner surface of the safety shield collar 315 causing rotation of the safety shield collar 315 in a counter clockwise direction, unlocking the safety shield 312, and allowing its movement in a proximal direction to reset the safety shield 312 under the force of the plunger 325.

FIG. 15 is a partial sectional view of an embodiment of the device 300 during reset, the reset cap 340 shown fully inserted into the device 300. In order to achieve this position, the movement of the reset cap 340 toward the proximal end, further forces both the plunger 325 and the safety shield 312 in a proximal direction by contact with the reset cap 340. This causes reset of the device 300 by rotation of the safety shield collar 315 in a counterclockwise direction, allowing further movement of the plunger 325 past the safety shield collar 315. Further movement of the plunger 325 by way of reset with the reset cap 340 causes the plunger proximal end to contact the plunger collar inner ramp 347 to fully reset the actuation member 314 and the plunger 325 as well as the plunger collar 320, such that the device 300 is reset to a pre-use position for a subsequent training.

Figure 16A:
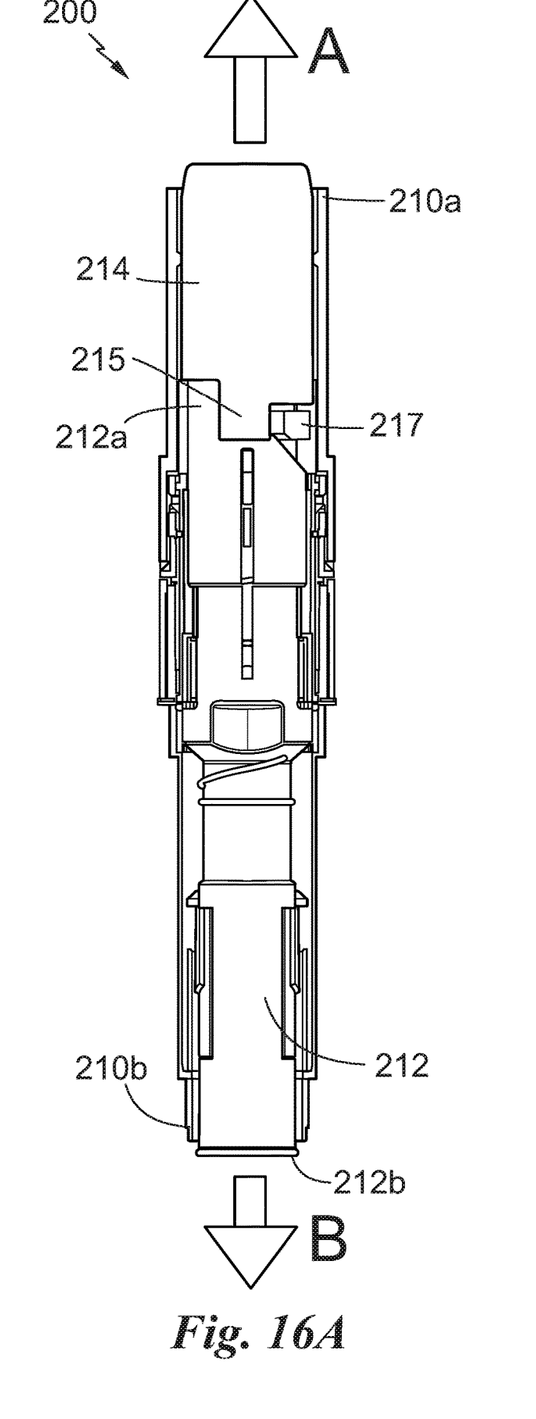
FIGS. 16A-16B partial sectional views of another embodiment of a resettable injection training device in a pre-use and an extended, locked position.
Figure 16B:
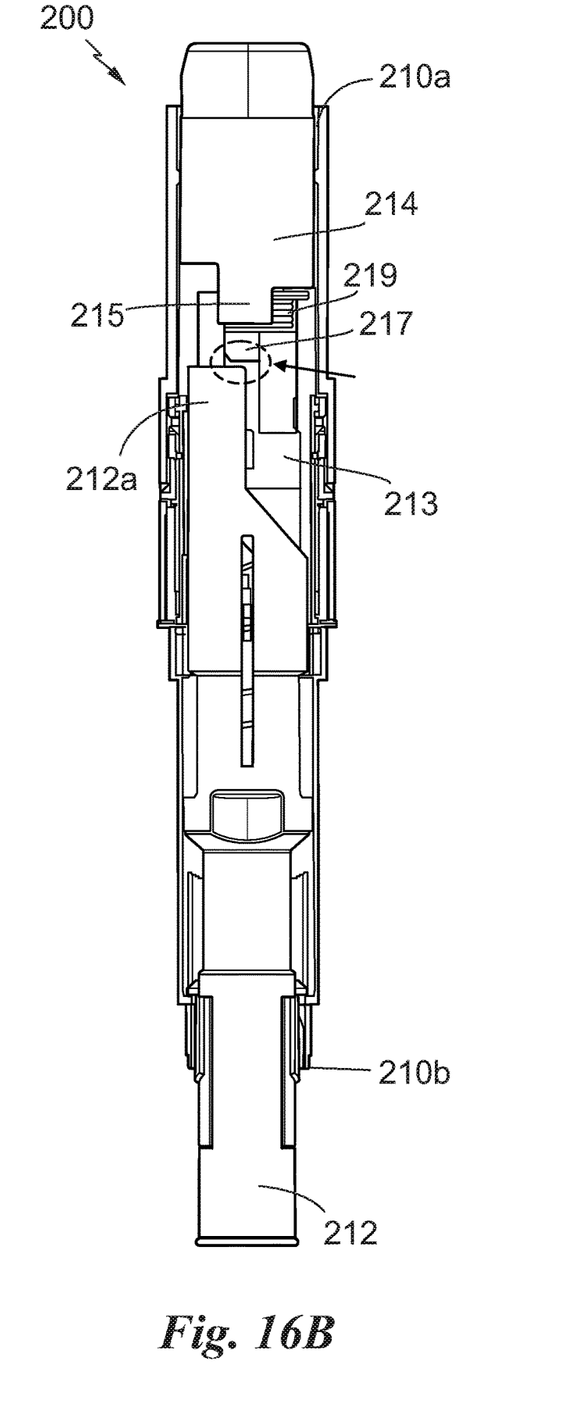

FIGS. 16A-B show another embodiment of a resettable injection training device 200 including an outer housing 210 having a proximal end 210a and a distal end 210b. The device 200 may further include a safety shield 212, slidable relative to the outer housing 210, an actuation member 214 positioned near the proximal end of the outer housing 210 and movable relative there to, and a plunger 225 (not shown) disposed within the device for deploying upon actuation of the device 200. The device may include a plunger spring for deploying the plunger 225 toward the distal end of the outer housing 210b upon actuation. The actuation member 214 may be depressive, and may include an actuation member tab 215. An actuation member spring may be associated with the actuation member to cause the actuation member to move proximally relative to the outer housing upon release of pressure on the actuation member 214 in some embodiments. The device 200 may include a rotating locking member 213 including a locking tab 217 and rotating locking member spring 219 causing rotation thereof. The rotating locking member 213 rotates relative to the device to lock the device 200 in a post-use position. The rotating locking member 213 interacts with the locking member spring 219 in some, non-limiting embodiments, causing the rotating locking member 213 to rotate upon completion of a training, and extension of the safety shield 212. In some non-limiting embodiments, the locking member spring 219 may include a torsion spring.

The safety shield 212 may include a safety shield proximal end 21a and a safety shield distal end 212b. The safety shield 212 may further interact with a safety shield biasing member 241 (not shown) may extend the safety shield toward a distal direction relative to the outer housing 210. Upon a pressure on the safety shield distal end 21b, the safety shield 212 moves proximally into the outer housing 210, and in some embodiments, the safety shield spring 241 is energized. Correct stepwise use of the device 200 in one embodiment includes contact with the safety shield distal end 21b causing a force on the safety shield distal end 21b, moving the safety shield into the device outer housing 210, followed by actuation of the actuation member 214 by depressing the actuation member 214, such that it moves toward the distal end of the device. This movement, in some embodiments, releases the plunger 225 such that it is deployed to extend toward the distal end of the device 200. Completion of use of the device includes release of the force on the distal end of the safety shield 212, causing the safety shield spring 241 to extend the safety shield 212, and release of the actuation member 214, such that the actuation member spring (not shown) to force the actuation member 214 in a proximal direction. Both release of the safety shield 212, and release of the actuation member 214 following use of the device 200 allows a rotating locking member 213 to rotate, such that the locking tab interfaces with the actuation member tab 215 and the proximal end of the safety shield 21a as can be seen in FIG. 16B. This action results in locking of the device 200 in a post-use position, wherein the safety shield 212 is in an extended, locked position and the actuation member 214 is in a locked position, preventing retraction of the safety shield 212 and preventing actuation of the actuation member 214 until reset of the device 200. FIG. 16A shows the device embodiment 200 during use, wherein the safety shield 212 and the actuation member 214 are activated during use. The arrows A and B, arrow A representing release of the actuation member 214 and arrow B representing release of the safety shield during an injection simulation causing an error condition (e.g. a wet injection error condition). As a consequence, the locking member rotates relative to the safety shield, such that locking tab 217 interfaces with the safety shield 212 as shown in FIG. 16B. This interaction between the locking tab 217 and safety shield 212 maintains the safety shield 212 in the extended, locked position until reset of the device.

In another non-limiting embodiment, removing the force on the distal end of the safety shield 21b prior to completion of an injection training and prior to release of the actuation member 214 causes the safety shield 212 to extend to a locked position, such that the locking tab 217 interfaces with the safety shield 212 to prevent retraction thereof until the device 200 is reset for a subsequent use. This mid-use lock of the device 200 trains users not to lift the injection device from the target surface until the injection is complete to avoid causing a wet injection.

If the device 200 is used as described above; however, the force on the distal end of the safety shield 21b is released prior to completion of a simulated injection (e.g., prior to full extension of the plunger) the safety shield 212 would be extended and locked in its extended position to deter users from releasing a drug delivery device from a target site prior to completion of injection. Removal of an injection device from a target site prior to completion of injection results in a wet injection, causing loss of product and delivery of an incorrect dose to a user. Consequently, use of the training device 200 trains users to maintain the force on the safety shield distal end 21b until completion of the injection so as to prevent locking of the device 200 prior to completion.

Figure 17A:
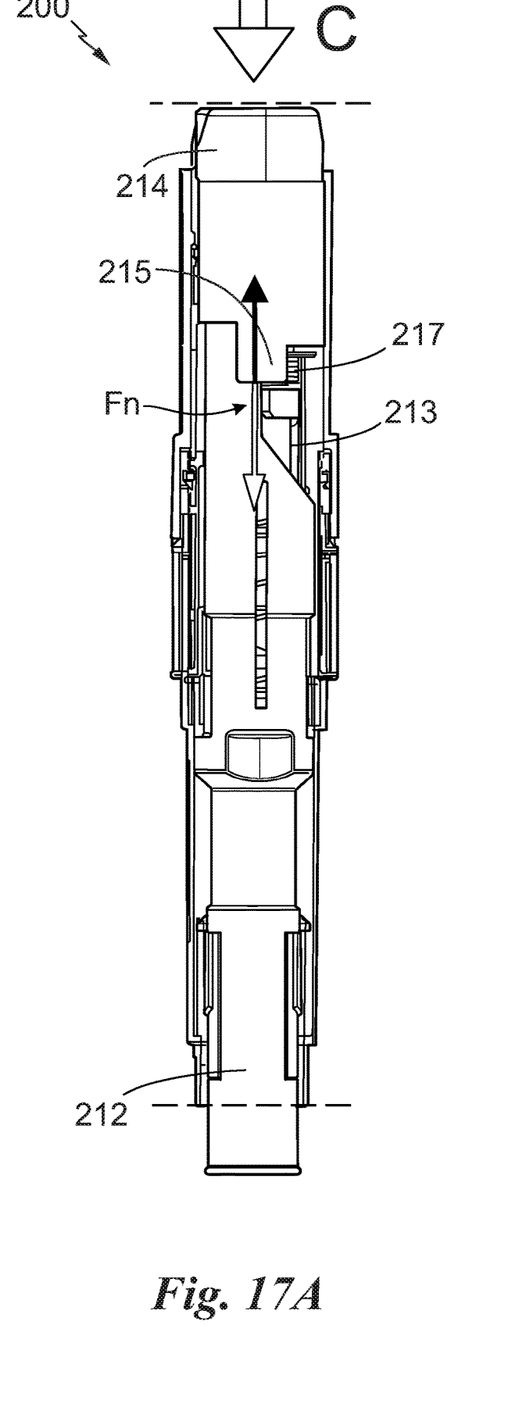
FIGS. 17A-17B are partial sectional views of an embodiment of a resettable injection training device showing stepwise use of the device in an incorrect sequence, wherein Rn represents increased friction during use in the incorrect sequence.
Figure 17B:
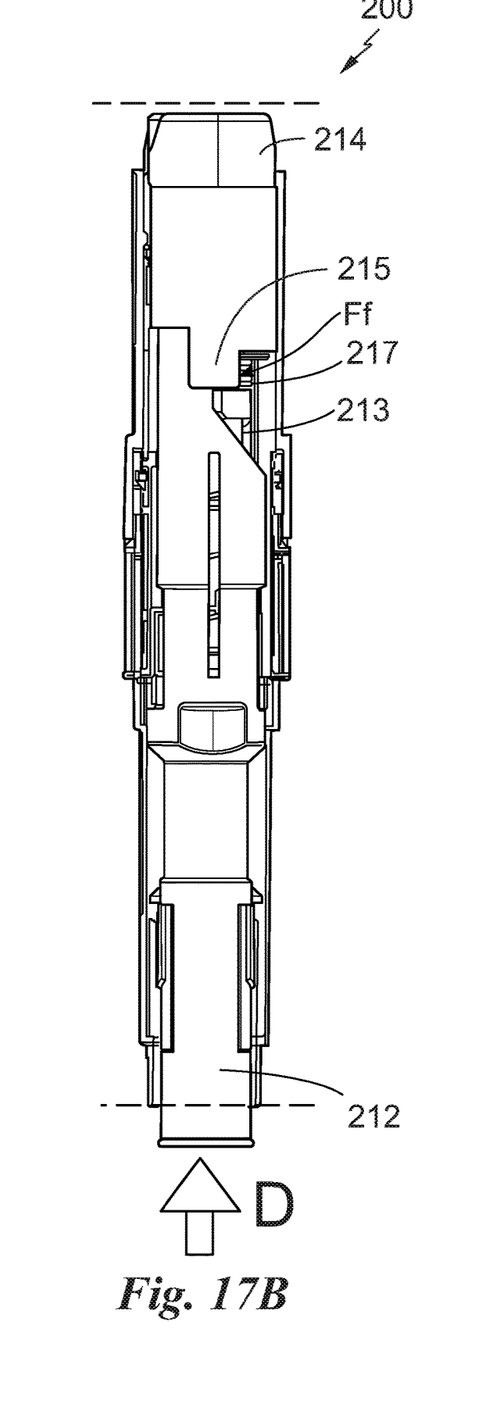

In training with the device 200, out of sequence use of the device is deterred, due to the structural characteristics of the device, and their interaction, as will be explained in greater detail herein. While correct use of the training device 200 includes the steps described above, it is possible to use the device in an out-of-sequence manner, in one embodiment. For example, in one embodiment of the device 200, it is possible to depress the actuation member 214 prior to applying a force on the safety shield distal end 212b; however the device 200 would not actuate if the device 200 were used in this incorrect order. If the actuation member 214 is depressed prior to retraction of the safety shield 212, in an out-of-order sequence of steps for use of the device 200, additional friction (Rn) would occur during movement of the actuation member 214 as can be seen in FIGS. 17A-17B. The additional friction occurs due to the interface between the locking tab 217 and the actuation member tab 215 during retraction of the safety shield 212, when the safety shield 212 is retracted (shown as arrow D in FIG. 17B) after the actuation member 214 is actuated (shown as arrow C in FIG. 17A). The actuation of the actuation member 214 causes a normal force on the surface of the locking tab 217 by way of the actuation member tab 215. When the locking member 213 rotates, the rotation force must overcome the friction between the locking tab 217 and the actuation member tab 215. This friction is elevated by the normal force between the actuation member tab 215 and the locking tab 217. The user then senses this additional friction (Rn), which operates as a deterrent to using the device 200 out-of-sequence, or at a minimum, provides a tactile feedback to a user that the device 200 is not being used in the correct sequence.

While one or more embodiments of the present invention have been shown and described herein, such embodiments are provided by way of example only. Variations, changes and substitutions may be made without departing from the invention herein. Accordingly, it is intended that the invention be limited only by the spirit and scope of the appended claims. The teachings of all references cited herein are incorporated in their entirety to the extent not inconsistent with the teachings herein.

What is claimed is:

1. A resettable injection training device for simulating an injection, comprising:
    an outer housing;
    a safety shield comprising a proximal end and a distal end, said distal end for engaging with a target surface during an injection simulation, the safety shield comprising a retracted position, an extended unlocked position and an extended locked position;
a plunger; and
a locking tab for interfacing with the safety shield in its extended locked position,
wherein if the safety shield distal end disengages from the target surface during an injection simulation, the safety shield extends to the extended, locked position until the device is reset.

2. The resettable injection training device of claim 1, further comprising an actuation member, said actuation member comprising an activated position and a released position, wherein the plunger is extended when the actuation member is activated.

3. The resettable injection training device of claim 2, wherein upon disengagement of the safety shield distal end from the target surface and release of the actuation member, the safety shield extends to the extended, locked position, wherein the interface between the locking tab and the safety shield maintains the safety shield in the extended, locked position until reset of the device.

4. The resettable injection training device of claim 1, wherein the safety shield moves from the extended unlocked position to the reset position to initiate an injection simulation upon a force on the distal end of the safety shield toward the proximal end.

5. A resettable injection training device for simulating an injection, comprising:
an outer housing;
a safety shield comprising a proximal end and a distal end, said distal end for engaging with a target surface during an injection simulation, the safety shield comprising a retracted position, an extended unlocked position and an extended locked position;
a plunger;
an actuation member; and
a locking tab;
wherein proximal movement of the safety shield followed by activation of the actuation member actuates the device, and wherein an out of sequence operation of the device, comprising activation of the actuation member followed by proximal movement of the safety shield causes resistance during operation.

6. The resettable injection training device of claim 5, wherein activation of the actuation member followed by proximal movement of the safety shield causes an interface between the actuation member, the locking tab and the safety shield, increasing resistance during actuation of the device.

7. The resettable injection training device of claim 5, wherein the actuation member further comprises an actuation tab for interfacing with the locking tab.

8. The resettable training device of claim 5, wherein the safety shield comprises a ramped portion, said ramped portion for interfacing with the locking tab during the out of sequence operation increasing resistance during use.

9. A method for training a user to complete an injection in a correct sequence, comprising:
providing the injection training device of claim 5, wherein activation of the actuation member prior to proximal movement of the safety shield provides a tactile feedback to the user of an out of sequence operation of the device.

10. The method of claim 9, wherein the tactile feedback comprises resistance during proximal movement of the safety shield.

11. The method of claim 10, wherein a force required to move the safety shield proximally following activation of the actuation device requires a force of between 0.001 and 30 Newtons.

12. A resettable injection training device, comprising:
an outer housing, comprising a proximal end and a distal end;
a safety shield, comprising a proximal end and a distal end and being slidable relative to the outer housing between an extended unlocked position, a retracted position, and an extended locked position;
a plunger slidable relative to the outer housing between a retracted position and an extended position;
an actuation member associated with the proximal end of the inner housing, comprising an unlocked position and a locked position, said actuation member being unlocked when the safety shield is in the retracted position;
an actuation member collar for locking the actuation member when the safety shield is in an extended locked position or an extended unlocked position;
a rotatable plunger collar for interfacing with the actuation member and the plunger, such that depression of the actuation member rotates the plunger collar to release the plunger to the extended position;
wherein a pressure on the safety shield distal end slides the safety shield from the extended unlocked position to the retracted position, rotating the actuation member collar to unlock the actuation member, such that depression of the actuation member releases the plunger to the extended position, and wherein following release of the pressure on the safety shield distal end, the safety shield extends to the extended locked position and the actuation member is reset to its locked position.

13. The resettable injection training device of claim 12, wherein the actuation member collar comprises an actuation member lock, said actuation member lock for maintaining the actuation member in a locked position.

14. The resettable injection training device of claim 13, further comprising a reset component having a plunger interfacing portion and a shield-interfacing portion, such upon insertion of the plunger interfacing portion into the safety shield, the plunger interfacing portion interfaces with the distal end of the plunger, and the shield-interfacing portion interfaces with the distal end of the safety shield upon movement of the reset component in a proximal direction.

15. The resettable injection training device of claim 14, wherein movement of the reset component toward the proximal end of the outer housing resets the plunger to the retracted position and resets the safety shield to the extended unlocked position.

16. The resettable injection training device of claim 15, wherein movement of the plunger toward the proximal end of the device rotates the actuation member collar, resetting the safety shield to the extended unlocked position.

17. The resettable injection training device of claim 14, wherein movement of the plunger toward the proximal end of the device during reset of the device rotates the plunger to advance the plunger toward the proximal end.

18. The resettable injection training device of claim 17, wherein an interface between a plunger rail surface and an inner plunger collar ramp rotates the plunger collar such that the plunger passes through the plunger collar to a retracted position.

19. The resettable injection training device of claim 18, wherein interaction between the plunger rail surface and the inner plunger collar ramp during reset, resets the actuation member to a pre-use position, and resets the plunger to a retracted position for a subsequent use.

20. A method for simulating an injection comprising:
the resettable injection training device of claim 12, wherein a force on the distal end of the safety shield unlocks the actuation member;
a depression of the actuation member releases the plunger for injection simulation; and
release of the device from the target area extends the safety shield to an extended, locked position.

* * * * *